April 3, 1934.  P. LIM  1,953,084
VEHICLE
Filed Feb. 17, 1932  2 Sheets-Sheet 2
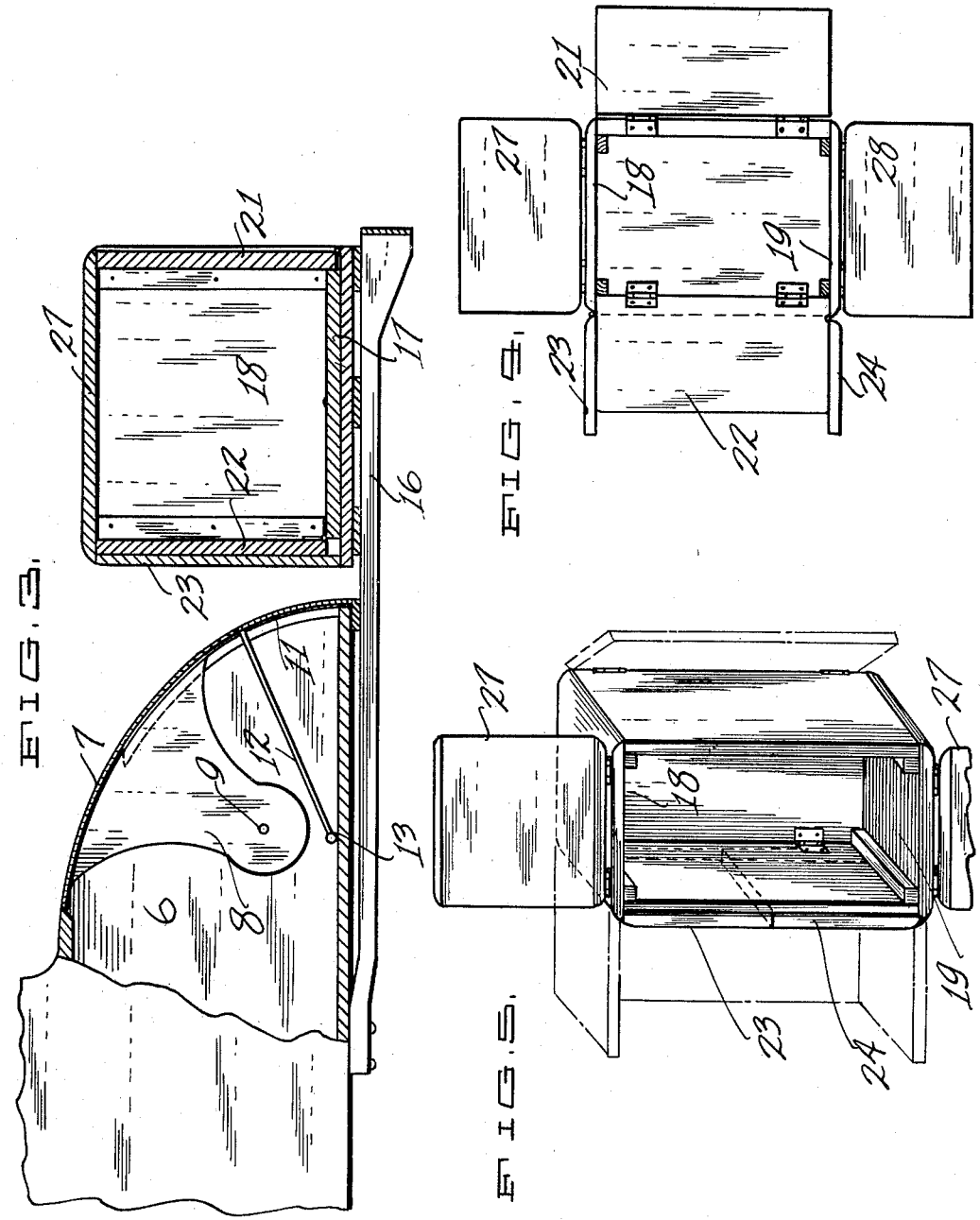
INVENTOR.
PETER LIM.
BY Victor J. Evans & Co
ATTORNEYS.

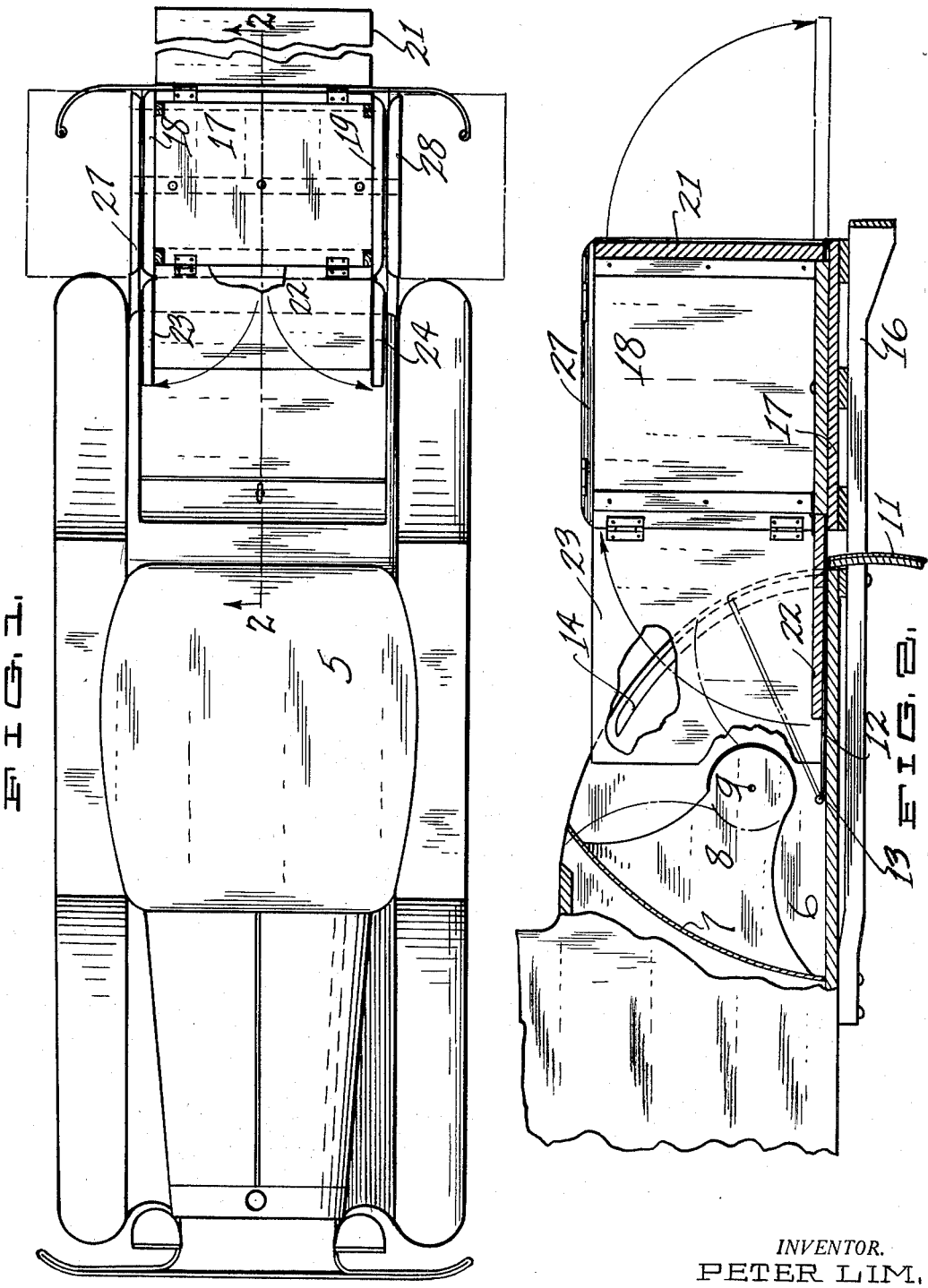

Patented Apr. 3, 1934

1,953,084

UNITED STATES PATENT OFFICE 1,953,084

VEHICLE

Peter Lim, Los Angeles, Calif.

Application February 17, 1932, Serial No. 593,626

4 Claims. (Cl. 296—26)

This invention relates to improvements in vehicles, and has particular reference to means for converting a pleasure vehicle into a delivery wagon.

The principal object of the invention is to provide a trunk-like container, which container may be unfolded in such a manner as to form a delivery body in conjunction with the vehicle body.

A further object is to produce a device which when not in use as a delivery body forms a separate trunk of a conventional type so as not to detract from, but in fact enhance, the appearance of the vehicle.

A still further object is to produce a device which is economical to manufacture, and simple to operate.

Other objects and advantages will be apparent during the course of the following description.

In the accompanying drawings forming a part of this specification and in which like numerals are employed to designate like parts throughout the same, Fig. 1 is a top plan view of my device as the same would appear in use, Fig. 2 is a cross sectional view taken on the line 2—2 of Fig. 1, Fig. 3 is a fragmentary view similar to Fig. 2, and showing my device in closed position, Fig. 4 is a plan view of my device in open position, and Fig. 5 is a perspective view of my device showing the same partly folded.

It is often the case that a person desires to use a vehicle for both pleasure and delivery purposes, and it is to accommodate this desire that I have devised a trunk arrangement which may be mounted upon the vehicle and which may be unfolded in such a manner so as to combine with the vehicle body to present a considerable space in which packages may be placed.

In the accompanying drawings wherein for the purpose of illustration is shown a preferred embodiment of my invention, the numeral 5 designates a motor vehicle the rear portion of the body of which is in the form of a curved deck providing the customary storage space 6 which is ordinarily enclosed by a single hinged cover (not shown). In place of this cover structure I provide a main cover section 7 of arcuate form secured to side brackets 8 pivoted as at 9. A supplemental cover section 11 secured to a rod 12 pivoted as at 13 co-acts with the cover section 7 and with the side and bottom walls of the deck, to enclose the storage space 6. Supporting rails 14 secured to the side walls of the deck serve to hold the cover sections 7 and 11 in proper place when closed. A trunk rack 16 of any suitable construction projects from the rear of the vehicle body and is utilized as a support for the structure embodying my invention which comprises several sections in the form of rectangular panels including a bottom section 17 to which is rigidly secured upright end sections 18 and 19. The bottom section is fixed to the trunk rack 16 in spaced relation to the rear end of the deck; and hinged to the bottom section along its front and rear sides are side sections 21 and 22, the section 21 being adapted to function as a tail gate when the device is converted to provide the delivery body.

The side section 22 can be swung downwardly and forwardly from the vertical position shown in Figure 3 to the horizontal position shown in Figure 2 so as to rest upon the bottom wall of the deck, as will be understood. Other side sections 23 and 24 each of approximately half the length of the side section 22 are hingedly secured, respectively, to the forward vertical edges of the end sections 18 and 19 and can be swung to the position of Figure 4, or may be closed as shown in Figures 3 and 5. Top sections 27 and 28, each of approximately half the length of the bottom section 17 are hingedly connected, respectively, to the end sections 18 and 19 along the top edges of the latter and complete the convertible structure of my invention.

When the device is in folded position, as shown in Figure 3, the same has the appearance of a conventional trunk on the vehicle, to which access can be had by opening the top sections 27 and 28, it being understood that any suitable fastening means can be provided to maintain the movable section of the structure in the folded position. In this position, the cover sections 7 and 11 are closed and, therefore, the vehicle has the appearance of an ordinary runabout with a separate trunk on the rack 16. When it is desired to convert the vehicle for delivery purposes, the cover section 7 is swung forwardly into the storage space of the deck, and the cover section 11 is swung downwardly, all as shown in Figure 2, the cover section 11 passing down between the trunk rack 16 and the deck, or it may be folded flat on the floor of the deck by being hinged to the bottom wall of the deck when the gasoline tank presents an obstruction.

The side sections 23 and 24 are now swung outwardly so as to lie parallel to and form continuations of the side walls of the deck, the side section 22 being dropped down as in Figure 2 and functioning to maintain the side sections 23 and 24 spread apart against the side walls of the deck as well as to form a continuation of the bottom wall of the deck. The top sections 27 and 28 are now swung outwardly and downwardly so as to rest against the outer sides of the end sections 18 and 19, as shown in Figure 1, the result being that the trunk as previously formed by the several sections has been converted by the aforestated adjustment of the sections, to co-act with the deck space of the vehicle body in providing a storage space of large capacity.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a vehicle, a vehicle body having a deck storage space at the rear thereof; a convertible structure supported at the rear of the body and composed of sections; means whereby the sections can co-operate in forming a trunk; means whereby the sections can co-act with the deck space in forming an extension of the latter beyond the rear of the body; and means whereby one of the sections can be raised and lowered to function as a tail gate at the rear end of the extension.

2. In a vehicle, a vehicle body having at the rear thereof a bottom wall and side walls rising therefrom for co-action therewith in providing a storage space opening towards the rear of the vehicle to a point substantially at the level of said bottom wall; a convertible structure supported at the rear of the vehicle body and composed of sections co-operable to form a trunk independent of the storage space; and means for hingedly connecting certain of said sections to the structure for movement to an extended position leaving the front of the structure entirely open with one of said sections resting upon the bottom wall of the storage space and others of said sections extending into the storage space at the side walls thereof, so that the structure will co-act with the storage space in forming a rearward enlargement for the latter in uninterrupted communication therewith.

3. In a vehicle, a vehicle body having at the rear thereof a bottom wall and side walls rising therefrom for co-action therewith in providing a storage space opening towards the rear of the vehicle to a point substantially at the level of said bottom wall; a convertible structure supported at the rear of the vehicle body and composed of sections co-operable to form a trunk independent of the storage space; and means for hingedly connecting certain of said sections to the structure for movement to an extended position leaving the front of the structure entirely open and the top of the latter unobstructed for access thereto from above and towards the rear, with one of said sections resting upon the bottom wall of the storage space and others extending into the latter at the side walls thereof so that the structure will co-act with the storage space in forming a rearward enlargement of the latter in uninterrupted communication therewith.

4. In means for adding to the capacity of a deck space at the rear of an automobile, the combination with the body of an automobile having a rearwardly opening deck space partially defined by a substantially horizontally disposed bottom wall and a pair of spaced apart substantially parallel side walls, of a structure supported at the rear of the body and including a normal bottom disposed substantially in the same plane as the bottom wall of said deck space, and a foldable wall adapted when adjusted to one position to extend onto the bottom wall of the deck space and to co-act therewith and with the normal bottom to provide a continuous floor extending from the extreme forward end of the deck space to the extreme rear end of said structure, and a plurality of foldable walls carried by said structure and adapted to be extended into the deck space and to occupy positions in substantial parallelism with the side walls of the deck space.

PETER LIM.